United States Patent
Beers et al.

(10) Patent No.: US 11,781,441 B2
(45) Date of Patent: Oct. 10, 2023

(54) AIR CYCLE MACHINE WITH SEPARATE COMPRESSOR AND TURBINE AND FAN AND TURBINE

(71) Applicant: Hamilton Sundstrand Corporation, Charlotte, NC (US)

(72) Inventors: Craig M. Beers, Wethersfield, CT (US); Donald E. Army, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 34 days.

(21) Appl. No.: 17/666,890

(22) Filed: Feb. 8, 2022

(65) Prior Publication Data
US 2023/0212955 A1 Jul. 6, 2023

Related U.S. Application Data

(60) Provisional application No. 63/294,977, filed on Dec. 30, 2021.

(51) Int. Cl.
*F01D 11/08* (2006.01)
*F25B 9/00* (2006.01)
*B64D 13/08* (2006.01)

(52) U.S. Cl.
CPC .............. *F01D 11/08* (2013.01); *B64D 13/08* (2013.01); *F25B 9/004* (2013.01); *F05D 2240/55* (2013.01)

(58) Field of Classification Search
CPC ........ F01D 11/08; B64D 113/08; F25B 9/004; F05D 2240/55
See application file for complete search history.

(56) References Cited

U.S. PATENT DOCUMENTS

| | | | | |
|---|---|---|---|---|
| 5,249,934 A | * | 10/1993 | Merritt | F04D 25/04 417/406 |
| 5,309,735 A | * | 5/1994 | Maher, Jr. | B64D 13/00 417/406 |
| 8,347,647 B2 | * | 1/2013 | McAuliffe | B64D 13/06 62/401 |

(Continued)

FOREIGN PATENT DOCUMENTS

| | | |
|---|---|---|
| EP | 1933040 B1 | 8/2016 |
| JP | 3131624 | 2/2001 |

OTHER PUBLICATIONS

European Search Report for EP Application No. 22211088.4 dated May 12, 2023.

*Primary Examiner* — Igor Kershteyn
(74) *Attorney, Agent, or Firm* — Carlson, Gaskey & Olds, P.C.

(57) ABSTRACT

An air cycle machine includes an air inlet connected to an air cycle compressor. Air downstream of the air cycle compressor is connected to be delivered across a first turbine. The air cycle compressor is driven by the first turbine through a shaft. Air downstream of the first turbine is connected to a second turbine. The second turbine is connected to deliver air downstream. The second turbine is connected with a second shaft to drive a fan rotor. The fan rotor delivers a source of air across a primary heat exchanger positioned between the inlet and the air cycle compressor. The air cycle compressor and the first turbine are formed of a metal. The second turbine and the fan rotor are formed of non-metallic materials.

20 Claims, 3 Drawing Sheets

(56) References Cited

U.S. PATENT DOCUMENTS

| | | |
|---|---|---|
| 10,428,684 B2 | 10/2019 | Robertson, Jr. |
| 10,428,732 B2 * | 10/2019 | Lynn .................. F02C 3/04 |
| 10,710,160 B2 | 7/2020 | Army et al. |
| 10,808,714 B2 | 10/2020 | Ishii et al. |
| 10,987,733 B2 | 4/2021 | Erno et al. |
| 10,988,223 B2 * | 4/2021 | Oran .................. B63H 11/113 |
| 11,015,610 B2 | 5/2021 | Ishii et al. |
| 2002/0088245 A1 | 7/2002 | Sauterleute et al. |
| 2010/0288429 A1 * | 11/2010 | Mathon ................ F01D 25/24 |
| | | 156/243 |
| 2016/0047248 A1 | 2/2016 | Wallis et al. |
| 2016/0160863 A1 | 6/2016 | Roach et al. |
| 2017/0057621 A1 | 3/2017 | Evulet |
| 2019/0135440 A1 | 5/2019 | Bruno et al. |
| 2021/0239124 A1 | 8/2021 | Stefanovic et al. |

\* cited by examiner

AIR CYCLE MACHINE WITH SEPARATE COMPRESSOR AND TURBINE AND FAN AND TURBINE

CROSS-REFERENCE TO RELATED APPLICATION

This application claims priority to U.S. Provisional Patent Application No. 63/294,977 filed on Dec. 30, 2021.

BACKGROUND

This application relates to an air cycle machine wherein a compressor and a first turbine are provided as a separate element from a fan and a second turbine.

Air cycle machines are known, and typically provide air for use in aircraft cabin applications. In an air cycle machine, compressed air is tapped from a main compressor associated with a gas turbine engine on the aircraft and delivered into an air cycle compressor.

Air downstream of the air cycle compressor passes across a first turbine which drives the compressor. Air downstream of the first turbine passes across a second turbine which also drives a common shaft with a shaft driving the compressor through the first turbine.

Air passing to the compressor passes through a heat exchanger. The shaft extends to a fan which pulls air across the heat exchanger.

Air cycle machines are subject to high temperature loads. Typically, the fan, compressor and both turbines have been formed of metal. The same is true of housings which surround those components.

SUMMARY

An air cycle machine includes an air inlet connected to an air cycle compressor. Air downstream of the air cycle compressor is connected to be delivered across a first turbine. The air cycle compressor is driven by the first turbine through a shaft. Air downstream of the first turbine is connected to a second turbine. The second turbine is connected to deliver air downstream. The second turbine is connected with a second shaft to drive a fan rotor. The fan rotor is configured to deliver a source of air across a heat exchanger positioned between the inlet and the air cycle compressor. The air cycle compressor and the first turbine are formed of a metal. The second turbine and the fan rotor are formed of non-metallic materials.

These and other features will be best understood from the following drawings and specification, the following is a brief description.

DETAILED DESCRIPTION

Figure 1:
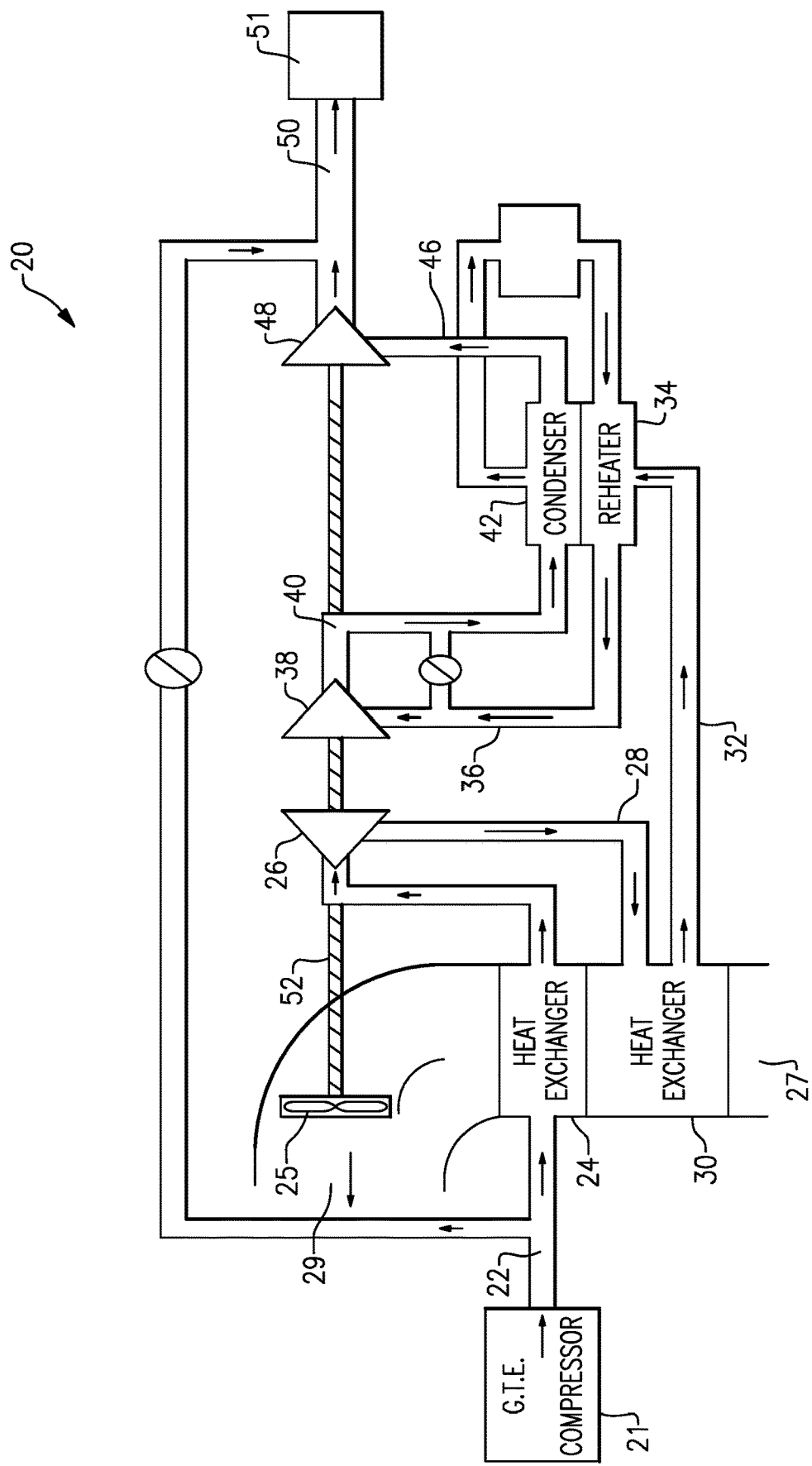
FIG. 1 shows a schematic of a prior art air cycle machine.

A prior art air cycle machine 20 is illustrated in FIG. 1. Air is tapped from a compressor 21 associated with a gas turbine engine. The air passes into a conduit 22, and through a primary heat exchanger 24. Air downstream of the primary heat exchanger 24 passes into an inlet of an air cycle compressor 26. That air then passes through a line 28 to a secondary heat exchanger 30. Cooling air is drawn into inlet 27 by a fan 25 which draws the air across the heat exchanger 24 and 30 and to an outlet 29. When the air reaches the fan rotor 25 it thus has been heated from cooling air in the heat exchangers 24 and 30.

Air downstream of heat exchanger 30 passes through a conduit 32 to a reheater heat exchanger 34 which delivers air into a conduit 36 heading to a first turbine 38. A conduit 40 downstream of the first turbine 38 passes into a condenser heat exchanger 42 which is cooled by air in the reheater heat exchanger 34. Downstream of the condenser heat exchanger 42 the air passes into a conduit 46, and to a second turbine 48. That air passes into a conduit 50 heading to a mixing chamber 51, which will eventually pass the air into an aircraft cabin. As can be appreciated from the Figure, there are many other conduits associated with such a system, but for understanding this application the mentioned elements are of primary importance.

In the prior art, a single shaft 52 rotates with compressor 26, turbines 38 and 48, and fan 25. In this prior art system, each of the rotors of the fan 25, compressor 26 and turbines 38 and 48 were formed of metal. Further, their housings have also been formed of metal.

Figure 2:
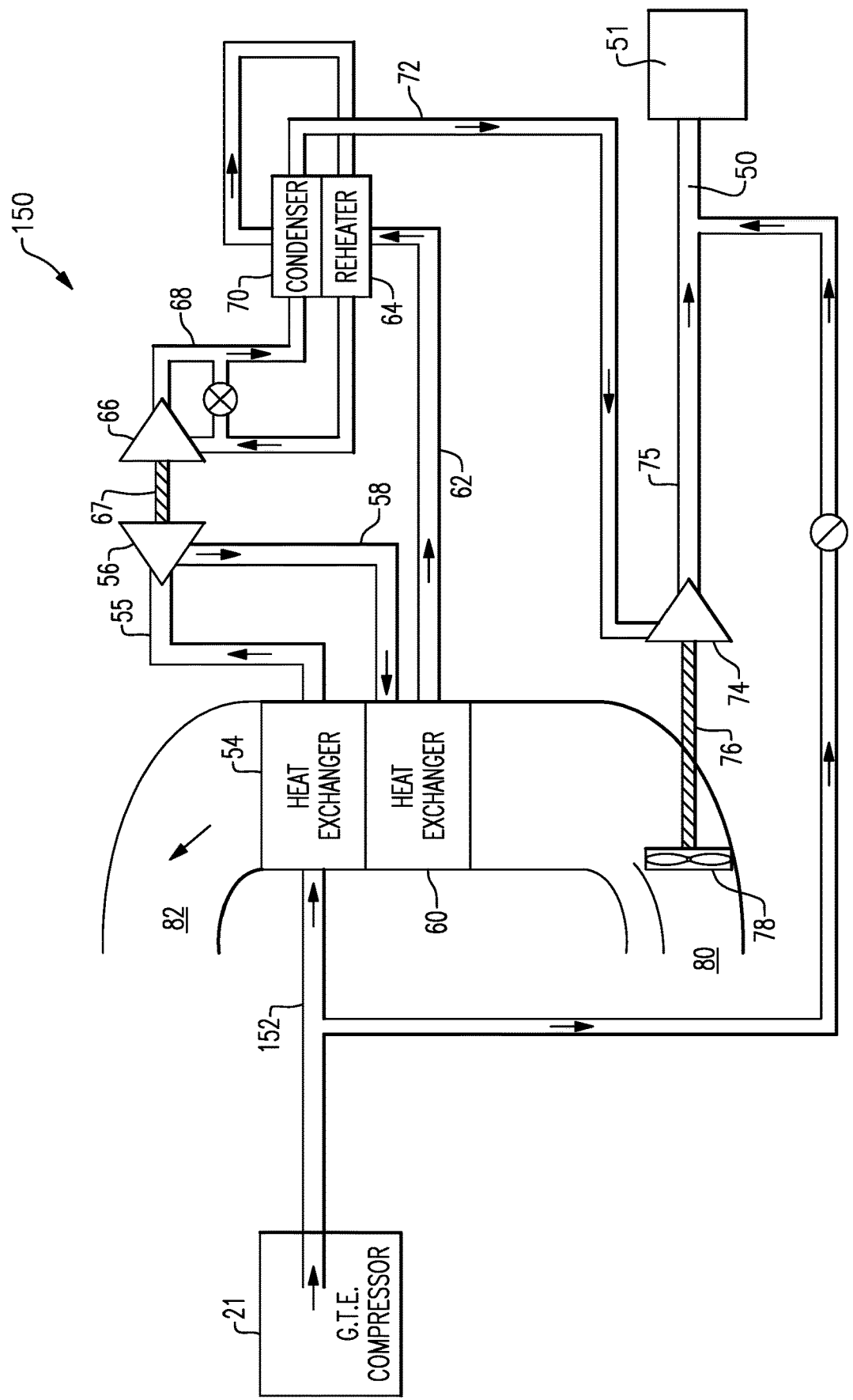
FIG. 2 shows a schematic of a disclosed air cycle machine.

FIG. 2 shows a disclosed air cycle machine 150. Again, air is bled from a compressor 21 associated with a gas turbine engine into a conduit 152. That air passes through a primary heat exchanger 54 and into a conduit 55 heading to an air cycle compressor 56. The air is then compressed and passes into a conduit 58, through the secondary heat exchanger 60, and into a conduit 62. The air in conduit 62 passes into reheater heat exchanger 64, and to a first turbine 66. Downstream of the first turbine 66, the air passes into a conduit 68, and into a condenser 70.

The compressor 56, and first turbine 66 are driven by a common shaft 67.

Air downstream of the line 72 passes across a second turbine 74, which drives a fan rotor 78 through a shaft 76. Downstream of the second turbine 74 the air passes into a conduit 75, and to a conduit and to mixing chamber 51 where it is eventually delivered into a cabin of an aircraft.

Fan rotor 78 has been moved from the location of the prior art FIG. 1 system. Fan 78 pushes the air from the inlet 80 across the heat exchangers 60 and 54 to the outlet 82.

In this system, the fan rotor 78, shaft 76 and second turbine 74 are all formed of non-metallic materials while the compressor 56, shaft 67 and turbine 66 are all formed of metal. Forming the fan 78, turbine 74 and shaft 76 of non-metallic materials raises challenges. By separating the fan 78 and turbine 74 from the compressor 56 and turbine 66, the fan is allowed to rotate at a slower speed as is the turbine 74. This facilitates the use of non-metallic materials to form the components. Moreover, positioning the fan 78 to be upstream of the heat exchanger 60 and 54 results in the fan "seeing" lower temperatures than the fan 25 in the prior art FIG. 1. This further facilitates the use of non-metallic materials.

Figure 3:
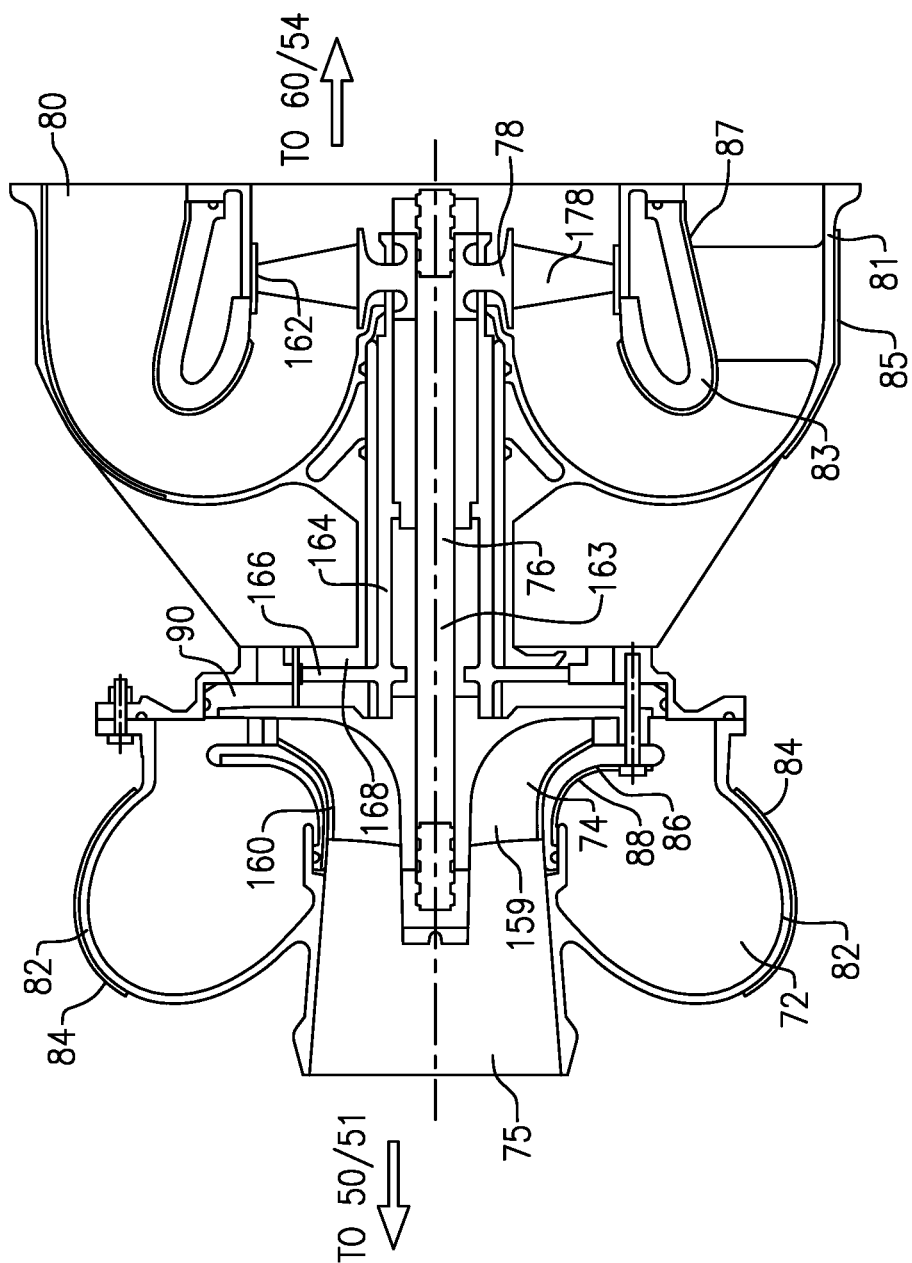
FIG. 3 shows a fan and second turbine section according to this disclosure.

FIG. 3 is a detail of the fan 78 and turbine 74. The inlet 72 to the turbine 74 is provided by a housing 82 and a nozzle 88. Housing 82 is positioned outwardly of the nozzle 88. The air downstream of the turbine 74 passes to conduit 75.

While the turbine 72 is shown without a shroud, in embodiments a shroud could be added. Forming a shrouded rotor raises challenges when using metal, however, using non-metallic materials and molding or additive manufacturing facilitates such manufacture.

Shaft 76 is shown to drive fan rotor 78. In fact, as illustrated, the shaft 76 may include an outer shaft 164 and an inner shaft or tie-rod 163. An outer housing 85 receives air from inlet 80, and fan rotor 78 moves that air across the heat exchangers 60 and 54. A turning ring 83 is shown in this embodiment.

Turbine 74 is shown with blades 159 and an outer surrounding shroud 160. The fan 78 is shown with plurality of fan blades 178 and outer surrounding shroud 162. The shrouds 160 and 162 are circumferentially continuous and are end fixed to their respective blades. In an embodiment the shrouds and blades are formed together, such as by additive manufacturing. When forming the blades of non-metallic materials there is a greater chances of blade deflection. The surrounding shroud resists such deflection. Also by having the shroud be part of the rotor the flow path being the shroud and blade tips is more closely controlled than if the shroud was separate from the rotor.

Forming a shrouded rotor raises challenges when using metal, however, using non-metallic materials and molding or using additive manufacturing facilitates such a manufacture. In addition, the manufacturing techniques used for a metal rotor and shroud, such as brazing a shroud to the blade, can cause some material harm. The disclosed rotor is uniform.

A shaft thrust runner 166 is shown intermediate a seal or thrust plate 90 and a thrust bearing 168.

As also shown, Kevlar® layer 84 may be positioned outwardly of the housing 82. Alternatively, or in addition, a Kevlar® layer 88 may be positioned outwardly of the nozzle 86. Similarly, a Kevlar® layer 87 may be positioned outwardly of the turning ring 83 and a Kevlar® layer 85 may be positioned outwardly of the housing 81. Kevlar® is a registered trademark for a material that is formed of poly-para-phenylene terephthalamide While Kevlar® is specifically disclosed, other appropriate burst resistant materials may be utilized as the containment layer.

Forming the fan and compressor and the associated housings of non-metallic materials dramatically reduces the weight. Such elements can be injection molded, or formed using additive manufacturing, which reduces not only the weight but also the cost.

However, challenges are raised. In particular, there is increased deflection compared to metallic parts. This could lead to greater clearances and negatively impact the dynamic performance. The parts are also less resistant to stress than metallic parts. In addition, such components may not successfully address very high temperatures.

However, with the changes in the positioning of the fan 78 relative to the heat exchanger 60 and 54, the heat challenges on the fan are reduced. Moreover, by enlarging the turbine 74, the speed, and thus the stress and heat on not only the turbine 74, but also the fan 78 are reduced. Further, separating the cycle compressor and the first turbine from the fan and second turbine reduces stresses on the fan and the second turbine.

In embodiments, the compressor 56, shaft 67, and turbine 66 can all be formed of materials such as are known in the art. In particular, aluminum may be used for systems having lower operating temperatures (say on the order of 400° F. or less), titanium may be utilized for a slightly higher temperature, and CRES (a stainless steel) or nickel based steel alloys may be utilized for very high temperatures.

On the other hand, the housings, nozzle seal plate 90 and turning ring 82, 86, 90, and 83, as well as the rotors 74 and 78, and shafts 76 may be formed of non-metallic materials such as plastics, including polyetherketone, polyetherketoneketone or polyetherimide. Polyetherimide is available under the trade name ULTEM®. Other non-metallic materials such as composites can also be utilized. In addition, the fan rotor 78 may be provided with an erosion resistant paint.

While embodiments have been disclosed, a worker of skill in this art would recognize that modifications would come within the scope of this disclosure. For that reason the following claims should be studied to determine the true scope and content.

What is claimed is:

1. An air cycle machine comprising:
an air inlet connected to an air cycle compressor, the air cycle compressor connected to deliver air across a first turbine, said air cycle compressor being driven by said first turbine through a shaft, air downstream of said first turbine being connected to a second turbine, said second turbine connected to deliver air downstream, and said second turbine being connected with a second shaft to drive a fan rotor, said fan rotor configured to deliver a source of air across a primary heat exchanger positioned between said air inlet and said air cycle compressor; and
said air cycle compressor and said first turbine being formed of a metal, and said second turbine and said fan rotor being formed of non-metallic materials.

2. The air cycle machine as set forth in claim 1, wherein said fan rotor is upstream of said primary heat exchanger, and configured to deliver air across said primary heat exchanger.

3. The air cycle machine as set forth in claim 2, wherein air downstream of said first turbine is connected to pass through a second heat exchanger before reaching said second turbine, and said fan rotor also configured to deliver air across said second heat exchanger.

4. The air cycle machine as set forth in claim 3, wherein the air downstream of said air cycle compressor passing through said second heat exchanger, and then reaching a reheater heat exchanger before passing to said first turbine, air downstream of said first turbine passing through a condenser which is configured to be cooled by air in said preheat heat exchanger before passing to said second turbine.

5. The air cycle machine as set forth in claim 4, wherein said fan rotor having a turning ring positioned outwardly of said fan rotor and said second turbine having nozzle positioned radially outwardly of an impeller in said second turbine, and an outer fan housing defining an inlet to said fan rotor and an outer turbine housing defining an inlet to said second turbine, said outer fan housing being radially outwardly of said turning ring, and said outer turbine housing being radially outwardly of said nozzle and said nozzle, said turning ring and said outer housings all being formed of a non-metallic material.

6. The air cycle machine as set forth in claim 5, wherein a seal plate is positioned behind the impeller of said second turbine, and said seal plate being formed of a non-metallic material.

7. The air cycle machine as set forth in claim 6, wherein a containment layer is positioned upon at least one of said outer housing and said nozzle of said second turbine, and at least one of said outer housing and said turning ring of said fan, wherein said containment layer is formed of poly-para-phenylene terephthalamide.

8. The air cycle machine as set forth in claim 7, wherein said non-metallic materials is one of polyetherketone, polyetherketoneketone or polyeitherimide.

9. The air cycle machine as set forth in claim 8, wherein said metal is at least one of aluminum, titanium, stainless steel or nickel based steel alloys.

10. The air cycle machine as set forth in claim 1, wherein the second turbine having a turbine rotor with a plurality of turbine blades and a shroud fixed for rotation with the turbine blades, and the fan rotor having a plurality of fan blades, and a fan shroud fixed for rotating with the fan blades.

11. The air cycle machine as set forth in claim 1, wherein the air delivered into the inlet to the air cycle compressor is tapped from a main compressor section on an associated gas turbine engine.

12. The air cycle machine as set forth in claim 1, wherein the air downstream of the second turbine is connected to a mixing chamber and eventually to be delivered into a cabin on an associated aircraft.

13. The air cycle machine as set forth in claim 12, wherein said fan rotor having a turning ring positioned outwardly of said fan rotor and said second turbine having nozzle positioned radially outwardly of an impeller in said second turbine, and an outer fan housing defining an inlet to said fan rotor and an outer turbine housing defining an inlet to said second turbine, said outer fan housing being radially outwardly of said turning ring, and said outer turbine housing being radially outwardly of said nozzle and said nozzle, said turning ring and said outer housings all being formed of a non-metallic materials.

14. The air cycle machine as set forth in claim 13, wherein a seal plate is positioned behind the impeller of said second turbine, and said seal plate being formed of a non-metallic material.

15. The air cycle machine as set forth in claim 1, wherein said fan rotor having a turning ring positioned outwardly of said fan rotor and said second turbine having nozzle positioned radially outwardly of an impeller in said second turbine, and an outer fan housing defining an inlet to said fan rotor and an outer turbine housing defining an inlet to said second turbine, said outer fan housing being radially outwardly of said turning ring and said outer turbine housing being radially outwardly of said nozzle and said nozzle, said turning ring and said outer housings all being formed of a non-metallic materials.

16. The air cycle machine as set forth in claim 15, wherein a containment layer is positioned upon at least one of said outer housing and said nozzle of said second turbine, and at least one of said outer housing and said turning ring of said fan.

17. The air cycle machine as set forth in claim 16, wherein said containment layer is formed of poly-para-phenylene terephthalamide.

18. The air cycle machine as set forth in claim 1, wherein said non-metallic materials is one of polyetherketone, polyetherketoneketone or polyeitherimide, and said metal is at least one of aluminum, titanium, stainless steel or nickel based steel alloys.

19. An air cycle machine comprising:
an air inlet connected an air cycle compressor, the air cycle compressor connected to deliver air across a first turbine, said cycle compressor being driven by said first turbine through a shaft, air downstream of said first turbine being connected to a second turbine, said second turbine connected to deliver air downstream, and said second turbine being connected with a second shaft to drive a fan rotor, said fan rotor configured to deliver a source of air across a primary heat exchanger positioned between said air inlet and said air cycle compressor;
wherein the second turbine having a turbine rotor with a plurality of turbine blades and a shroud fixed for rotation with the turbine blades, and the fan rotor having a plurality of fan blades, and a fan shroud fixed for rotating with the fan blades;
said air cycle compressor and said first turbine being formed of a metal, and said second turbine and said fan rotor being formed of non-metallic materials;
said fan rotor is upstream of said primary exchanger, and is configured to deliver air across said primary heat exchanger;
air downstream of said first turbine is connected to pass through a second heat exchanger before reaching said second turbine, and said fan inlet also configured to deliver air across said second heat exchanger;
wherein the air downstream of said air cycle compressor passing through said second heat exchanger, and then reaching a preheat heat exchanger before passing to said first turbine, air downstream of said first turbine passing through a condenser which is configured to be cooled by air in said preheat heat exchanger before passing to said second turbine;
wherein said fan rotor having a turning ring positioned outwardly of said fan rotor and said second turbine having nozzle positioned radially outwardly of an impeller in said second turbine, and an outer fan housing defining an inlet to said fan rotor and an outer turbine housing defining an inlet to said second turbine, said outer fan housing being radially outwardly of said turning ring, and said outer turbine housing being radially outwardly of said nozzle and said nozzle, said turning ring and said outer housings all being formed of a non-metallic materials, a seal plate positioned behind the impeller of said second turbine, and said seal plate being formed of a non-metallic materials;
said non-metallic materials is one of polyetherketone, polyetherketoneketone or polyeitherimide; and
wherein said metal is at least one of aluminum, titanium, stainless steel or nickel based steel alloys.

20. The air cycle machine as set forth in claim 19, wherein a containment layer is positioned upon at least one of said outer housing and nozzle of said second turbine, and at least one of said outer housing and said turning ring of said fan, said containment layer is formed of poly-para-phenylene terephthalamide.

* * * * *